United States Patent
Chen et al.

(10) Patent No.: US 8,707,718 B2
(45) Date of Patent: Apr. 29, 2014

(54) SYSTEM AND METHOD FOR CONTROLLING A VEHICLE ENGINE

(75) Inventors: Elaine Y. Chen, Dearborn, MI (US); William Treharne, Ypsilanti Township, MI (US); Wayne Buescher, Canton, MI (US); Thomas Fox, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2063 days.

(21) Appl. No.: 11/564,485

(22) Filed: Nov. 29, 2006

(65) Prior Publication Data

US 2008/0125934 A1    May 29, 2008

(51) Int. Cl.
*B60H 1/32* (2006.01)
*F25B 41/00* (2006.01)
*F25B 49/00* (2006.01)
*F25B 27/00* (2006.01)

(52) U.S. Cl.
USPC ............... 62/133; 62/208; 62/228.1; 62/239; 62/241; 62/323.1

(58) Field of Classification Search
USPC ............ 62/228.1, 133, 208, 239, 241, 323.1, 62/244, 243; 123/179.3, 179.4, 41.01
See application file for complete search history.

(56) References Cited

U.S. PATENT DOCUMENTS

| | | |
|---|---|---|
| 2,477,377 A | 11/1943 | Jones |
| 4,667,480 A | 5/1987 | Bessler |
| 4,918,937 A | 4/1990 | Fineblum |
| 5,018,362 A | 5/1991 | Nagase et al. |
| 5,117,643 A | 6/1992 | Sakurai et al. |
| 5,275,011 A | 1/1994 | Hanson et al. |
| 5,317,998 A | 6/1994 | Hanson et al. |
| 5,341,651 A | 8/1994 | Inoue |
| 5,441,122 A | 8/1995 | Yoshida |
| 5,497,941 A | 3/1996 | Numazawa et al. |
| 5,867,996 A | 2/1999 | Takano et al. |
| 5,934,089 A | 8/1999 | Nakagawa et al. |
| 6,073,456 A * | 6/2000 | Kawai et al. .............. 62/133 |
| 6,330,909 B1 | 12/2001 | Takahashi et al. |
| 6,515,448 B2 | 2/2003 | Iritani et al. |
| 6,516,621 B2 | 2/2003 | Homan et al. |
| 6,688,120 B2 | 2/2004 | Aoki et al. |
| 6,782,704 B2 | 8/2004 | Kuroda et al. |

(Continued)

FOREIGN PATENT DOCUMENTS

| | | |
|---|---|---|
| JP | 4208624 | 7/1992 |
| JP | 10258629 | 9/1998 |
| JP | 2001113940 | 4/2001 |
| JP | 2003285637 A | 10/2003 |

OTHER PUBLICATIONS

A. F. Burke, On-Off Engine Operation for Hybrid/Electric Vehicles, "The World's Knowledge" supplied by The British Library.

*Primary Examiner* — Allana Lewin
*Assistant Examiner* — Travis Ruby
(74) *Attorney, Agent, or Firm* — David B. Kelley; Brooks Kushman P.C.

(57) ABSTRACT

An engine configured to drive a compressor of a vehicle air conditioning system is controlled based on a threshold condition. In at least one embodiment, a comfort-level selection is received, a threshold condition is determined based on the comfort-level, and a vehicle interior condition is detected. The engine is requested to run if the interior condition exceeds the threshold condition.

18 Claims, 4 Drawing Sheets

(56) References Cited

U.S. PATENT DOCUMENTS

| | | |
|---|---|---|
| 6,807,470 B2 | 10/2004 | Hara |
| 6,817,330 B1 | 11/2004 | Ogawa et al. |
| 6,973,798 B2 | 12/2005 | Ikura et al. |
| 6,981,544 B2 | 1/2006 | Iwanami et al. |
| 2003/0233835 A1 | 12/2003 | Tomita et al. |
| 2004/0144107 A1 | 7/2004 | Breton et al. |
| 2004/0149246 A1* | 8/2004 | Itoh et al. .................. 123/179.4 |
| 2004/0250560 A1 | 12/2004 | Ikura et al. |
| 2005/0044873 A1 | 3/2005 | Tamai et al. |
| 2005/0268632 A1* | 12/2005 | Yonekura et al. ................ 62/236 |
| 2006/0225450 A1* | 10/2006 | Dage et al. .................. 62/323.1 |
| 2007/0049455 A1* | 3/2007 | Kuramochi ....................... 477/3 |

* cited by examiner

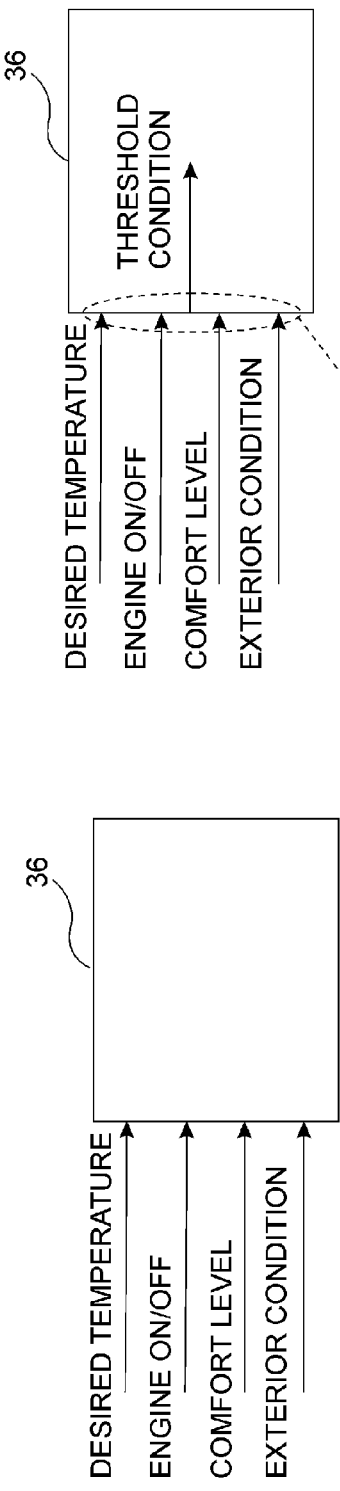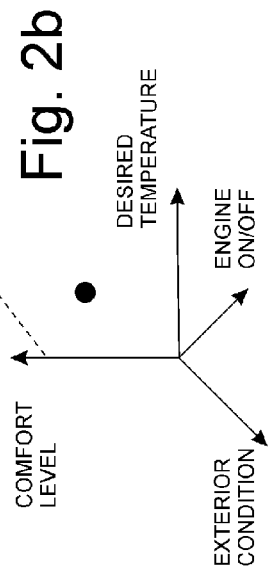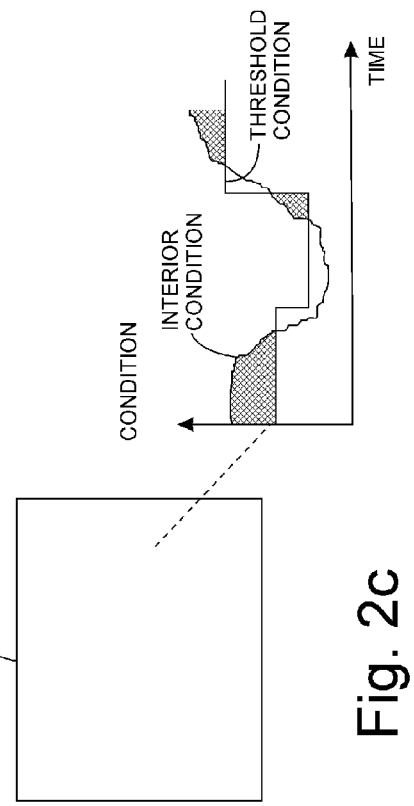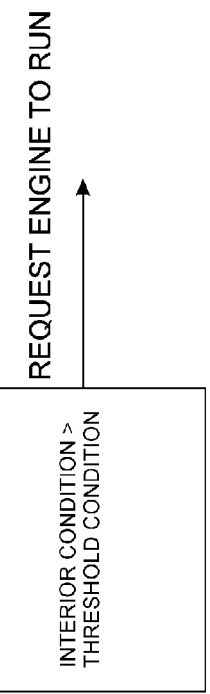
Fig. 2a
Fig. 2b
Fig. 2c
Fig. 2d

SYSTEM AND METHOD FOR CONTROLLING A VEHICLE ENGINE

BACKGROUND OF THE INVENTION

1. Field of the Invention

The invention relates to systems and methods for controlling a vehicle engine.

2. Background Discussion

An engine of an alternatively powered vehicle (e.g., a hybrid electric vehicle), may drive a compressor of the vehicle's air conditioning system such that when the engine if off, the compressor is off. In a hybrid electric vehicle the engine is off when the vehicle is powered solely using electric power. The compressor may be operated by turning the engine on such that an occupant-selected desired temperature is achieved when the vehicle is in the electric power drive mode or when the vehicle is not moving.

Determining whether to start the engine if it is off may depend on an interior condition, e.g., cabin temperature, of the vehicle. If the interior condition exceeds a threshold condition that is based on the desired temperature, the engine may be started so the compressor can operate.

The air conditioning system may be configured to allow an occupant of the vehicle to select between a first mode and a second mode. In the first mode, if the interior condition exceeds the threshold condition and the engine is off, the engine will remain off. This strategy may improve fuel economy but an occupant may perceive or feel discomfort. In the second mode, if the interior condition exceeds the threshold condition and the engine is off, the engine will be started. This strategy may prevent an occupant from perceiving or feeling discomfort but may reduce fuel economy. An occupant may be willing to tolerate uncomfortable threshold conditions in an effort to improve fuel economy.

A system and method are desired for controlling an engine to drive a compressor of a vehicle air conditioning system so that an occupant may selectively determine interior conditions for a given ambient condition.

SUMMARY OF THE INVENTION

The invention comprises a system and method for controlling an engine configured to drive a compressor of a vehicle air conditioning system. The system includes a control system arrangement. The arrangement receives a desired temperature selection and a comfort-level selection, and detects a vehicle interior condition. The arrangement determines a threshold condition based on the desired temperature and the comfort level. The arrangement requests the engine to run if the interior condition exceeds the threshold condition.

In at least one embodiment, the invention takes the form of a method for controlling an engine configured to drive a compressor of a vehicle air conditioning system. The method includes receiving a comfort-level selection and determining a threshold condition based on the comfort level. The method also includes receiving a vehicle interior condition. The method further includes requesting the engine to run if the interior condition exceeds the threshold condition.

BRIEF DESCRIPTION OF THE DRAWINGS

FIGS. 2a-2b show inputs to a control system arrangement in accordance with an embodiment of the invention.

FIG. 2c shows a comparison by a control system arrangement of an interior condition to a threshold condition in accordance with an embodiment of the invention.

FIG. 2d shows an output of a control system arrangement in accordance with an embodiment of the invention.

DETAILED DESCRIPTION OF EMBODIMENTS OF THE INVENTION

Figure 1:
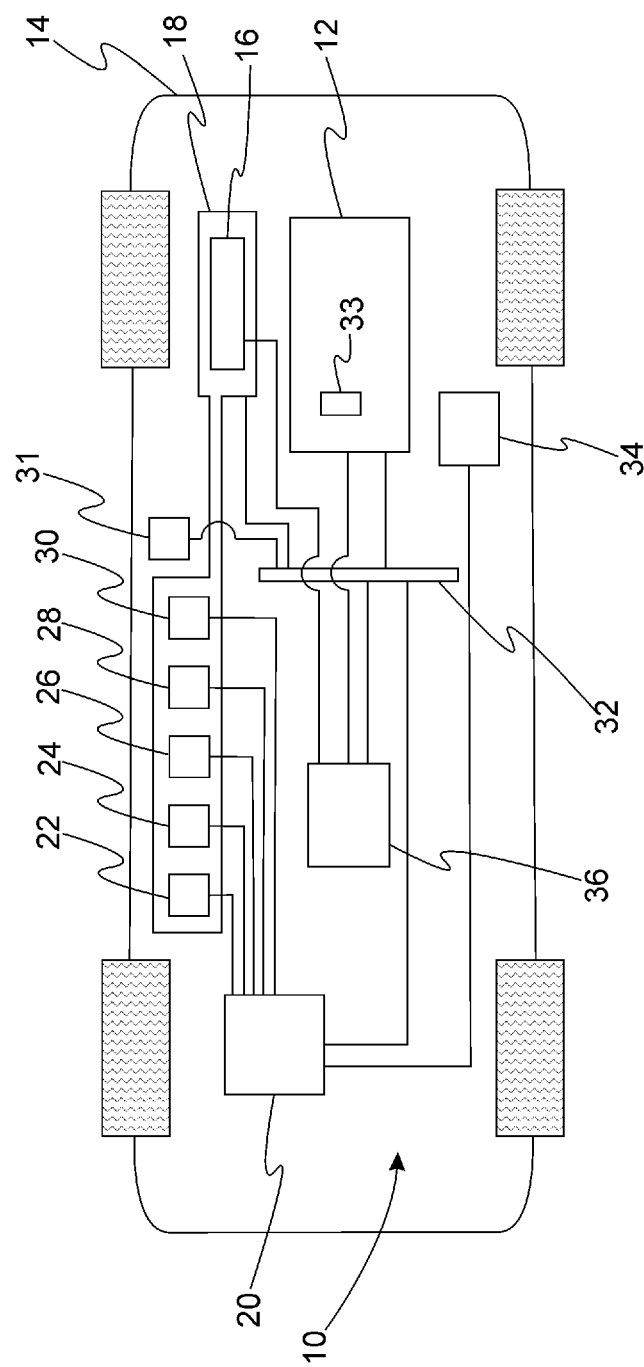
FIG. 1 shows a system for controlling a vehicle engine in accordance with an embodiment of the invention.

FIG. 1 shows system 10 for controlling engine 12 of vehicle 14. Engine 12 drives compressor 16 of air conditioning system 18 such that if engine 12 is off, compressor 16 is off.

Vehicle 14 includes climate control module 20, ambient temperature sensor 22, ambient humidity sensor 24, sun load sensor 26, cabin temperature sensor 28, cabin humidity sensor 30, and vehicle speed sensor 31. Fewer or other sensors may be used; e.g., ambient humidity sensor 24 may be omitted.

In the embodiment of FIG. 1 sensors 22, 24, 26, 28, and 30 are part of air conditioning system 18.

Sensors 22, 24, 26, 28, and 30 communicate directly with climate control module 20. One or more of these sensors may, alternatively, communicate their respective readings to climate control module 20, or any other module or system, via data bus 32 using a Controller Area Network (CAN) protocol or via any other suitable means, e.g., hardwire or wireless.

Vehicle 14 includes manual input 34; e.g., buttons on a climate control head. Manual input 34 permits an occupant of vehicle 12 to manually input a comfort-level selection, e.g., economy mode or non-economy mode, as will be explained in detail below. Manual input 34 also permits an occupant to select a desired temperature for the vehicle's cabin. Manual input 34 communicates directly with climate control module 20.

System 10 includes control system arrangement 36, which comprises a powertrain control module and a vehicle system controller. Control system arrangement 36 may comprise one or more control modules in various locations of vehicle 14.

Control system arrangement 36 controls engine 12, determines whether vehicle 14 is moving based on a vehicle speed broadcast via data bus 32 from speed sensor 31, and detects an on/off state of engine 12 based on engine speed broadcast via data bus 32 from engine speed sensor 33. Control system arrangement 36 may determine also whether vehicle 14 is moving, as well as the on/off state of engine 12, in any suitable fashion.

Control system arrangement 36, air conditioning system 18, and climate control module 20 communicate via data bus 32 using CAN. Climate control module 20 may broadcast data from sensors 22, 24, 26, 28, and 30 over data bus 32. Control system arrangement 36 may, alternatively, request data regarding sensors 22, 24, 26, 28, and 30 from climate control module 20.

Control system arrangement 36, engine 12, and compressor 16 communicate directly via hardwire. Control system arrangement 36, engine 12, air conditioning system 18, climate control module 28, and manual input 34 may communicate, alternatively, in any suitable fashion, e.g., hardwire or wireless.

FIG. 2a shows an example set of inputs; e.g., "DESIRED TEMPERATURE", "ENGINE ON/OFF", "COMFORT LEVEL", and "EXTERIOR CONDITION", used by control system arrangement 36 to determine whether to output a request to run engine 12; e.g., set an engine control flag to "1". The exterior condition may include ambient temperature, ambient humidity, and sun load. Fewer or other inputs may also be used.

FIG. 2b shows that a threshold condition may be based on, or a function of, one or more of the inputs.

The threshold condition may be a threshold cabin temperature, a threshold cabin humidity, or a threshold probability of fog occurring on the vehicle's windshield. Fewer or other thresholds may be used including evaporator temperature.

The threshold cabin temperature may be that temperature beyond which an occupant may experience discomfort due to a change in temperature. For example, if an occupant sets the desired temperature to 72 degrees Fahrenheit (F), the threshold cabin temperature may be 77 degrees F. Above 77 degrees F., the occupant may experience discomfort.

The threshold cabin humidity may be that humidity beyond which an occupant may experience discomfort due to a change in humidity. For example, if an occupant sets the desired temperature to 72 degrees F., the threshold cabin humidity may be 65%. Above 65% humidity, the occupant may experience discomfort from the humidity.

The threshold probability of fog occurring on the vehicle's windshield may be that probability beyond which fog may affect occupant vision. This probability can be determined for various desired temperatures, for example, through vehicle testing at differing temperatures and humidities.

The threshold condition may be a function of the exterior condition. For example, as the ambient temperature increases, the threshold cabin temperature may decrease. If the threshold cabin temperature is set at 80 degrees F., relative to a desired temperature of 76 degrees F. at an ambient temperature of 85 degrees F., as the ambient temperature increases, e.g., 87 degrees F., the threshold cabin temperature may decrease, e.g., 79 degrees F.

The threshold condition may be a function of the on/off state of engine 12. For example, if engine 12 is "on", the threshold condition may be less than if engine 12 is "off". Further, relative to a desired temperature of 72 degrees F., the threshold cabin temperature may be 80 degrees F. when engine 12 is "off" and 77 degrees F. when engine 12 is "on". This strategy allows air conditioning system 18 to optimize fuel economy and occupant comfort based on the on/off state of engine 12.

Likewise, removing the request for engine 12 to run may be based on the on/off state of engine 12. For example, if engine 12 is "on" the threshold at which the request for engine 12 to run is removed may be less than if engine 12 is "off". Further, relative to a desired temperature of 72 degrees F., the threshold at which the request for engine 12 to run is removed may be 75 degrees F. when engine 12 is "off" and 72 degrees F. when engine 12 is "on". This strategy allows air conditioning system 18 to optimize fuel economy and occupant comfort based on the on/off state of engine 12.

The threshold condition may be a function of the desired temperature. As a first example, as the desired temperature decreases, the difference between the threshold cabin temperature and the desired temperature may increase. Further, if the desired temperature is 65 degrees F., the threshold cabin temperature may by 72 degrees F. If the desired temperature is 70 degrees F., the threshold cabin temperature may be 75 degrees F. As a second example, testing may reveal that the threshold cabin humidity is 65% for a desired temperature of 72 degrees F. and 70% for a desired temperature of 68 degrees F.

The threshold condition may be determined for each possible desired temperature. For example, testing may reveal that, for a desired temperature of 70 degrees F., the threshold cabin temperature is 73 degrees F., the threshold humidity is 65%, and the threshold probability of fog is 35% and that, for a desired temperature of 71 degrees F., the threshold temperature is 73 degrees F., the threshold humidity is 68%, and the threshold probability of fog is 30%. Threshold conditions, alternatively, may be determined in any suitable fashion.

The difference between the threshold cabin temperature and the desired temperature may be predetermined. The threshold cabin temperature may be set at a fixed amount, e.g., 5 degrees F., above the desired temperature. For example, if the desired temperature is 70 degrees F., the threshold cabin temperature will be 75 degrees F. If the desired temperature is 77 degrees F., the threshold temperature will be 82 degrees F. The fixed amount may be determined in any suitable fashion including via in-car testing or computer modeling.

The threshold condition depends on the comfort level. For example, if an occupant selects an economy mode, the threshold temperature is greater than when the occupant selects a non-economy mode. If the threshold cabin temperature is 80 degrees F. in the non-economy mode, relative to a 75 degree F desired temperature, the threshold cabin temperature is 83 degrees F. in the economy mode. An occupant may be selectively willing to experience a greater temperature change relative to their desired temperature thereby reducing engine on time in an effort to improve fuel economy.

Several threshold conditions may be used such that if any one is exceeded, engine 12 is requested to run. For example, for a desired temperature of 72 degrees F. and while the engine is "off", the threshold cabin temperature may be 77 degrees F., the threshold humidity may be 68%, and the threshold probability of fog may be 30%. If any of the these thresholds is exceeded, engine 12 will be requested to run.

The threshold conditions may reside in look-up tables or calculated in real-time based on the interior conditions.

FIG. 2c shows that control system arrangement 36 compares each threshold condition to its corresponding interior condition in determining whether to request engine 12 to run. The cross-hatched regions indicate where the interior condition exceeds the threshold condition.

The interior condition may be a cabin temperature, cabin humidity, or sun load. Different or other interior conditions may be used including, for example, evaporator temperature and discharge air temperature. The interior temperature may depend on the cabin temperature, cabin humidity, and sun load and may be determined, for example, via a look-up table listing interior temperatures for various values of cabin temperature, cabin humidity, and sun load.

FIG. 2d shows that control system arrangement 36 may request engine 12 to run if the interior condition exceeds the threshold condition.

Figure 3:
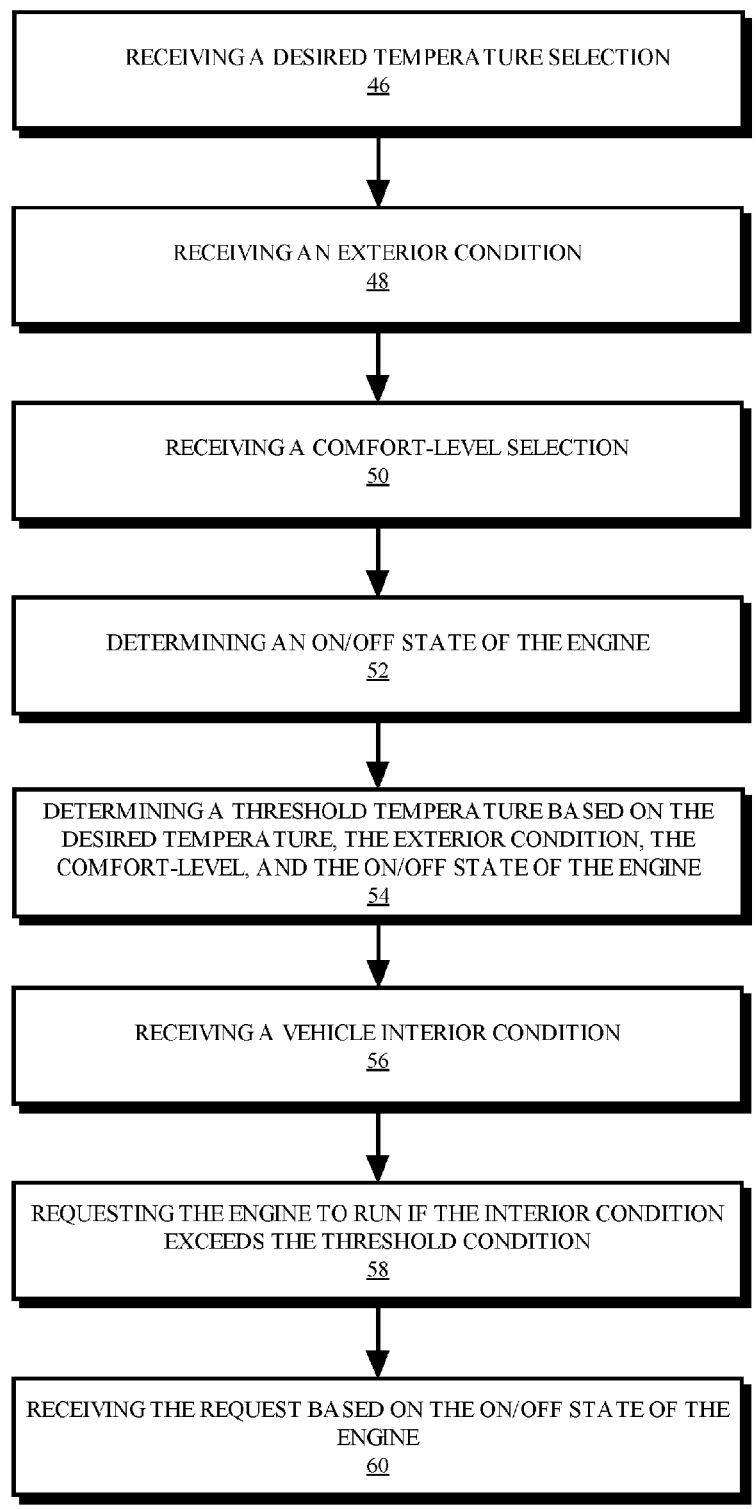
FIG. 3 shows a strategy for controlling a vehicle engine in accordance with an embodiment of the invention.

FIG. 3 shows a method for controlling an engine configured to drive a compressor of a vehicle air conditioning system. At step 46, a desired temperature selection is received. At step 48, an exterior condition is received. At step 50, a comfort-level selection is received. At step 52, an on/off state of the engine is determined. At step 54, a threshold condition is determined based on the desired temperature, the exterior condition, the comfort-level, and the on/off state of the engine. At step 56, a vehicle interior condition is received. At step 58, the engine is requested to run if the interior condition exceeds the threshold condition. At step 60, the request is removed based on the on/off state of the engine.

Figure 4:
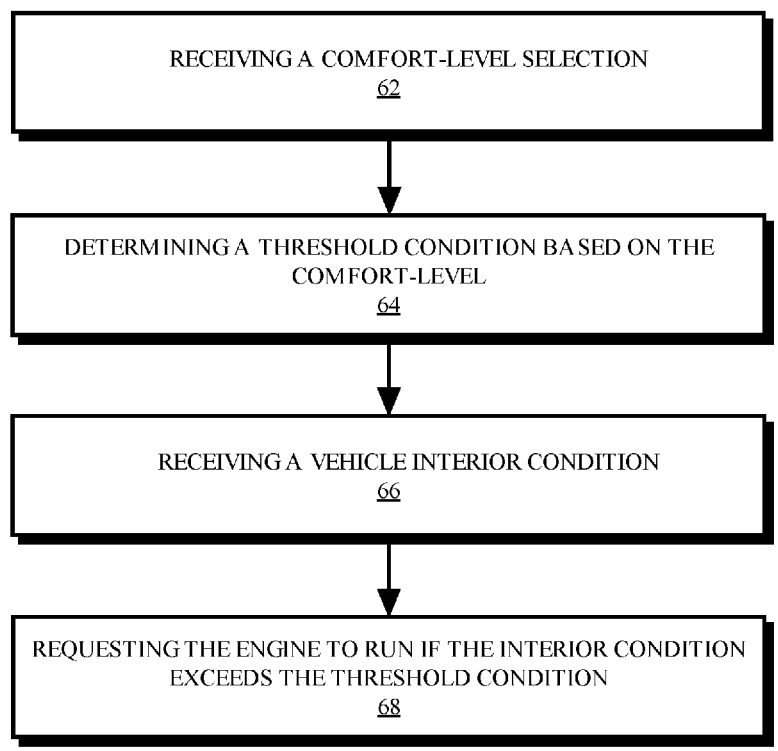
FIG. 4 shows a strategy for controlling a vehicle engine in accordance with an embodiment of the invention.

FIG. 4 shows a method for controlling an engine configured to drive a compressor of a vehicle air conditioning system. At step 62, a comfort-level selection is received. At step 64, a threshold condition is determined based on the comfort-level. At step 66, a vehicle interior condition is received. At step 68, the engine is requested to run if the interior condition exceeds the threshold condition.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling an engine configured to drive a compressor of a vehicle air conditioning system, the system comprising:
a control system arrangement configured to receive a desired temperature selection, receive a comfort-level selection, detect a vehicle interior condition, detect a vehicle exterior condition, determine a threshold condition based on the desired temperature, the comfort-level, and the exterior condition, and request the engine to run if the interior condition exceeds the threshold condition.

2. The system of claim 1 wherein the exterior condition comprises at least one of an ambient temperature, an ambient humidity, and a sun load.

3. The system of claim 2 wherein the threshold condition decreases as the exterior condition increases.

4. The system of claim 1 wherein the arrangement is further configured to determine an on/off state of the engine and wherein the threshold condition is further based on the on/off state of the engine.

5. The system of claim 4 wherein the request is removed based on the on/off state of the engine.

6. The system of claim 1 wherein the comfort-level selection includes at least one of an economy mode and a non-economy mode and wherein the threshold condition in the economy mode is greater than the threshold condition in the non-economy mode.

7. The system of claim 1 wherein the threshold condition is a threshold temperature and wherein the threshold temperature is greater than the desired temperature.

8. The system of claim 1 wherein the interior condition comprises at least one of a cabin temperature, a cabin humidity, and a sun load.

9. The system of claim 1 wherein the threshold condition is a threshold temperature and wherein a difference between the threshold temperature and the desired temperature is predetermined.

10. A method for controlling an engine configured to drive a compressor of a vehicle air conditioning system, the method comprising:
receiving a desired temperature selection;
receiving a comfort-level selection;
detecting a vehicle exterior condition;
determining a threshold condition based on the desired temperature, the comfort-level, and the exterior condition;
detecting a vehicle interior condition; and
requesting the engine to run if the interior condition exceeds the threshold condition.

11. The method of claim 10 wherein the exterior condition comprises at least one of an ambient temperature, an ambient humidity, and a sun load.

12. The method of claim 11 wherein the threshold condition decreases as the exterior condition increases.

13. The method of claim 10 further comprising determining an on/off state of the engine and wherein the threshold condition is further based on the on/off state of the engine.

14. The method of claim 13 further comprising removing the request based on the on/off state of the engine.

15. The method of claim 10 wherein the comfort-level selection includes at least one of an economy mode and a non-economy mode and wherein the threshold condition in the economy mode is greater than the threshold condition in the non-economy mode.

16. The method of claim 10 wherein the threshold condition is a threshold temperature and wherein the threshold temperature is greater than the desired temperature.

17. The method of claim 10 wherein the interior condition comprises at least one of a cabin temperature, a cabin humidity, and a sun load.

18. The method of claim 10 wherein the threshold condition is a threshold temperature and wherein a difference between the threshold temperature and the desired temperature is predetermined.

* * * * *